Feb. 10, 1959　　S. B. MYLLENBERG ET AL　　2,873,141
LIQUID SPRAYING MECHANISMS, PARTICULARLY
FOR DISH WASHING MACHINES
Filed Dec. 17, 1956

United States Patent Office 2,873,141
Patented Feb. 10, 1959

2,873,141

LIQUID SPRAYING MECHANISMS, PARTICULARLY FOR DISH WASHING MACHINES

Sven Bertil Myllenberg and Karl-Erik Wärnström, Halsingborg, Sweden

Application December 17, 1956, Serial No. 628,821

Claims priority, application Sweden December 28, 1955

1 Claim. (Cl. 299—71)

This invention relates to a liquid spraying mechanism, particularly for a dish washing machine, of the type having a horizontal arm which is swingable about a vertical shaft and has a number of liquid nozzles on its upper side for delivering vertically upwardly directed liquid jets.

The primary object of the invention is to deflect the liquid jets delivered by said nozzles laterally and thereby to exploit the reaction force arising as a result of the deflection so as to impart the desired swinging movement to said arm.

A further object is automatically to impart to said arm an oscillatory swinging movement by reversing the deflecting direction of said liquid jets relatively to said arm.

A more specific object of the invention is to provide a liquid spraying mechanism of the type referred to with a vane supported by and above said arm so that the liquid jets impinge upon it, and tiltable about an axis parallel to said arm to deflect the jets alternately to one or the other side, and abutment means for tilting over the vane, thereby reversing the deflecting direction and imparting an oscillatory swinging movement to said arm.

Figure 1:
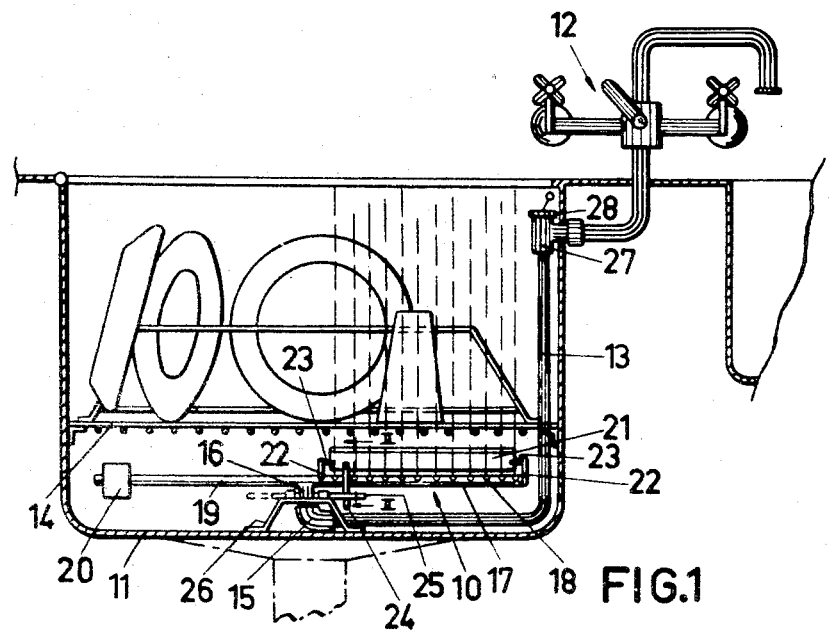
Figure 2:
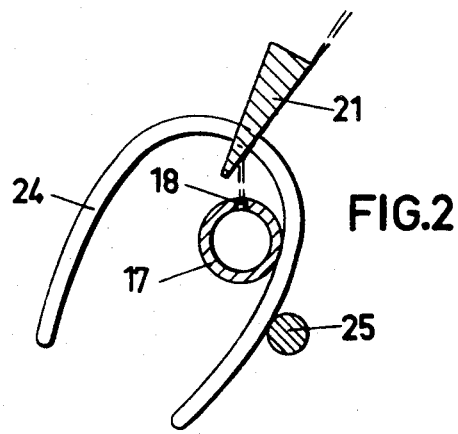

Further objects of the invention and the advantages gained thereby will appear from the following description, reference being had to the accompanying drawing, in which:

Fig. 1 is a vertical section of a dish washing machine with a liquid spraying mechanism according to the invention, and Fig. 2 is a section, on a larger scale, on line II—II in Fig. 1.

The illustrated dish washing machine comprises a liquid spraying mechanism 10 placed in a sink basin 11 and connected to a water main 12 by a pipe 13, and a dish supporting basket 14 in the sink basin above the liquid spraying mechanism.

The pipe 13 terminates in an elbow 15 the outlet end of which is directed vertically upwardly from the bottom of the sink basin, and the liquid spraying mechanism 10 consists of a T-shaped member having its central limb 16 mounted in the elbow 15. The horizontal portion of the liquid spraying mechanism is formed by a spraying tube 17, which constitutes one arm and which through the vertical limb 16 is in communication with the pipe 13 and has a row of nozzle openings 18 in its upper side, and by a rod 19 having a counterweight 20 balancing both the weight of the spraying tube 17 and the reaction force of the jets delivered through the holes 18 when liquid under pressure is supplied to the spraying mechanism through the pipe 13.

The liquid spraying mechanism 10 is thus adapted to rotate in the horizontal plane to spray the entire dish supporting basket 14 and the dishes therein from below, as is shown in Fig. 1, and for this purpose said spraying mechanism is also fitted with drive means consisting of an elongated vane 21 which is supported by and above the spraying tube 17 with the aid of a pair of upwardly directed lugs 22 on said tube carrying a pair of coaxial pivot pins 23. Said pivot pins define an axis which is parallel to and situated directly above the spraying tube 17. The vane 21 is tiltable about said axis to be hit on one or the other side by the liquid jets from the nozzle openings 18, thereby to deflect the jets towards one or the other side. The vane which has its centre of gravity above the tilting axis 23—23 is provided with an abutment member 24 in the shape of a horseshoe the limbs of which depend on either side of the spraying tube 17. This horseshoe member serves to limit the inclination of the vane by engaging the spraying tube with the inner sides of its limbs, and to tilt over the vane and stop the swinging movement of the spraying tube by engaging a stationary abutment member with the outer sides of its limbs. It is to be observed in this connection that the swinging movement of the spraying tube is retarded and may even be smoothly reversed by the vane tilting over and reversing the deflecting direction before the limit position shown in Fig. 2 is reached.

Said stationary abutment member is shown in the shape of a horizontal rod 25 slidably mounted on a support 26 which is secured to the bottom of the sink basin 11 but which may alternatively be secured to the pipe 13 or its elbow 15. Said rod 25 projects into the path of movement of the horseshoe member 24 with its one end, the sprayer then making almost a whole revolution after each reversal, but said rod may also be displaced so that it will form abutments at both ends, the sprayer then making only approximately half a revolution in alternate directions. Fig. 2 shows the positions of the vane and the abutment means at the very reversal, and after that the vane will remain in the illustrated inclination until the horseshoe member strikes the stationary abutment 25 with its opposite side.

The vane 21 and the abutment means 24, 25 thus fulfil the double function of imparting a desired swinging movement to the spraying tube 17 and reversing the deflection of the liquid jets so that a desired sector of the dish-supporting basket and the dishes therein are sprayed alternately in two different directions. By this arrangement an efficient washing of the dishes is obtained, with a relatively low water consumption.

Finally, Fig. 1 shows a fitting 27 in the pipe 13. This fitting contains a sieve and has a cover 28 which can be opened for the insertion upon said sieve of a tablet of a dish washing agent to be dissolved in the water to improve its cleansing effect.

What we claim and desire to secure by Letters Patent is:

A dishwashing machine comprising a basin, a horizontal spray pipe mounted for oscillation between limits of swinging movement about a vertical axis through the center of said basin, said pipe extending outwardly from said axis and having an outer end proximate the side wall of said basin, a vane mounted on and above said pipe and extending parallel thereto from a point proximate said vertical axis to a point proximate said outer end of said pipe, said pipe having nozzle openings spaced all along its upper side for delivering liquid spray jets vertically against said vane, said vane being mounted for rotation about a tilt axis spaced above said pipe and parallel thereto and having its center of gravity spaced above said tilt axis, said vane being tiltable about said tilt axis between two inclined positions for deflecting said liquid jets alternately toward the respective lateral sides of said pipe to impart a swinging movement to said pipe first in one direction and then in the other, a pair of limbs depending from said vane, one on each side of said pipe, each of said limbs in turn engaging fixed structure just before said spray pipe reaches one of said limits of swinging movement to shift the inclination of said vane from one of said inclined positions to the other and thereby reverse said swinging movement, said limbs alternately engaging said spray pipe to hold said vane alternately in said two inclined positions.

References Cited in the file of this patent

UNITED STATES PATENTS

| | | |
|---|---|---|
| 1,314,622 | Vaudreiul | Sept. 2, 1919 |
| 1,408,077 | Clinton | Feb. 28, 1922 |
| 1,491,253 | Barnes | Apr. 22, 1924 |
| 1,598,223 | Vaudreiul | Aug. 31, 1926 |
| 2,238,044 | Fullerton | Apr. 15, 1941 |
| 2,733,958 | Warren | Feb. 2, 1956 |